United States Patent
Yeung et al.

(10) Patent No.: US 10,623,708 B2
(45) Date of Patent: Apr. 14, 2020

(54) MOBILE DEVICE AND METHOD FOR ADVERTISING PROJECTING

(71) Applicant: IVIEW DISPLAYS (SHENZHEN) COMPANY LTD., Shenzhen (CN)

(72) Inventors: Steve Yeung, Hong Kong (CN); Zhiqiang Gao, Hong Kong (CN); Qingyun Lin, Shenzhen (CN)

(73) Assignee: IVIEW DISPLAYS (SHENZHEN) COMPANY LTD., Shenzhen, Guangdong (CN)

( * ) Notice: Subject to any disclaimer, the term of this patent is extended or adjusted under 35 U.S.C. 154(b) by 0 days.

(21) Appl. No.: 16/205,518

(22) Filed: Nov. 30, 2018

(65) Prior Publication Data

US 2019/0098269 A1 Mar. 28, 2019

Related U.S. Application Data

(63) Continuation of application No. PCT/CN2016/093421, filed on Aug. 5, 2016.

(51) Int. Cl.
*H04N 9/31* (2006.01)
*H04N 21/41* (2011.01)
*H04N 21/2668* (2011.01)
*H04N 21/442* (2011.01)
*H04W 4/23* (2018.01)
*G06Q 30/02* (2012.01)
(Continued)

(52) U.S. Cl.
CPC ....... *H04N 9/3173* (2013.01); *G06Q 30/0242* (2013.01); *G06Q 30/0261* (2013.01); *G06Q 30/0272* (2013.01); *H04L 67/26* (2013.01); *H04N 5/247* (2013.01); *H04N 9/31* (2013.01);

*H04N 9/3179* (2013.01); *H04N 9/3194* (2013.01); *H04N 21/2668* (2013.01); *H04N 21/41* (2013.01); *H04N 21/442* (2013.01); *H04W 4/23* (2018.02)

(58) Field of Classification Search
None
See application file for complete search history.

(56) References Cited

U.S. PATENT DOCUMENTS

2009/0141250 A1* 6/2009 Destain ................ G03B 21/10
353/69
2012/0194419 A1* 8/2012 Osterhout .......... G02B 27/0093
345/156
2014/0172579 A1* 6/2014 Peterson ............ G06Q 30/0269
705/14.66

FOREIGN PATENT DOCUMENTS

CN          2720557 Y      8/2005
CN       202307054 U      7/2012
CN       202339688 U      7/2012
(Continued)

*Primary Examiner* — Samira Monshi
(74) *Attorney, Agent, or Firm* — IPro, PLLC

(57) ABSTRACT

A mobile device and method for advertisement projecting. The mobile device includes: a main unit with a control circuit board; a projection module for projecting advertisement contents; a projection display window for completely displaying projection contents from the projection module, a camera module group for acquiring projection environment information in front of and behind the projection display window, and a main unit fixing device for fixing the mobile device for advertisement projecting on a mobile body. The main unit is configured to push corresponding advertisement contents which is projected by the projection module according to the projection environment information.

16 Claims, 3 Drawing Sheets

(51) Int. Cl.
*H04L 29/08* (2006.01)
*H04N 5/247* (2006.01)

(56) References Cited

FOREIGN PATENT DOCUMENTS

| | | |
|---|---|---|
| CN | 202339690 U | 7/2012 |
| CN | 104103223 A | 10/2014 |
| CN | 105023532 A | 11/2015 |
| CN | 105069656 A | 11/2015 |
| CN | 105208309 A | 12/2015 |
| CN | 205901973 U | 1/2017 |
| JP | 2012022163 A | 2/2012 |
| KR | 20160057707 A | 5/2016 |

* cited by examiner

MOBILE DEVICE AND METHOD FOR ADVERTISING PROJECTING

CROSS-REFERENCE TO RELATED APPLICATIONS

The present disclosure claims priority to Patent Application No. 201610485613.8, filed with the Chinese Patent Office on Jun. 28, 2016, titled "MOBILE DEVICE AND METHOD FOR ADVERTISING PROJECTING" and Patent Application No. PCT/CN2016/093421, filed with the Chinese Patent Office on Aug. 5, 2016, titled "MOBILE DEVICE AND METHOD FOR ADVERTISING PROJECTING", the entire contents of which are incorporated herein by reference.

TECHNICAL FIELD

The disclosure relates to the technical field of advertisement pushing, in particular to a mobile device for advertisement projecting and a method for mobile advertisement projecting.

BACKGROUND

Advertisements are an important channel for people to understand goods or services, and also an important means for manufacturers to promote products or services. The quality of advertisements and the channels of communication directly affect whether the benefits from their use are considerable or not. At present, advertising is no longer limited to the field of print media and television, but has extended to the field of the internet, such as being mounted on portal websites or embedded in communication software.

The advent of the mobile internet era and the popularity of mobile terminals allow advertisements to be embedded in mobile terminals to realize mobile advertisements which can interact with viewers. However, most of the mobile advertisements now only focus on the breadth, aiming at the public by mandatory indoctrination and failing to meet the particular needs of users, and the public just accepts them passively and indiscriminately, resulting in low acceptance of advertisements and poor communicating effect of advertising contents.

In particular, mobile phone spam messages and advertisements cannot accurately control the covered user data, thus failing to realize the division based on factors such as user characteristics or location characteristics, which is critical to establishing clear target groups and user data. As a result, the endless advertisements can only repel users. In addition, due to the limitation of the screen of a mobile terminal, there is only a small space for displaying advertisement contents, as a result, the advertisement contents displayed on the mobile terminal are so small that users often ignore them, resulting in much lower advertising efficiency.

SUMMARY

An embodiment of the present disclosure provides a mobile device for advertisement projecting. The mobile device includes a main unit with a control circuit board, a projection module arranged in the main unit for projecting advertisement contents, a projection display window arranged on the main unit for completely displaying projection contents from the projection module, a camera module group arranged on the main unit for acquiring projection environment information in front of and behind the projection display window and a main unit fixing device arranged on the main unit for fixing the mobile device for advertisement projecting on a mobile body. The main unit is configured to push corresponding advertisement contents which is projected by the projection module according to the projection environment information.

Another embodiment of the present disclosure provides a method for mobile advertisement projecting. The method includes: acquiring a projection environment information in front of and behind a projection advertisement window, providing corresponding advertisement contents to a mobile device for advertisement projecting according to the projection environment information, projecting the advertisement contents by a projection module.

DETAILED DESCRIPTION

The present disclosure will now be described in detail with reference to the accompanying drawings and embodiments.

Figure 1:
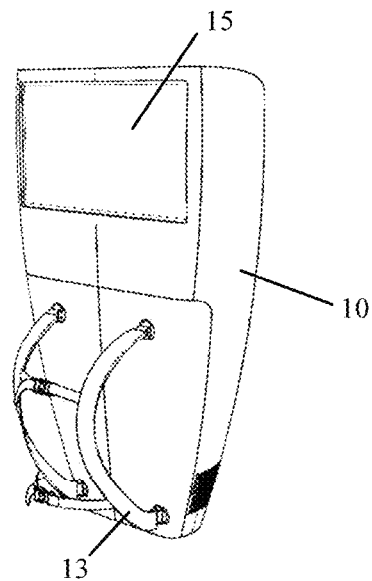
FIG. 1 is a structure diagram of a mobile device for advertisement projecting according to an embodiment of the present disclosure.
Figure 2:
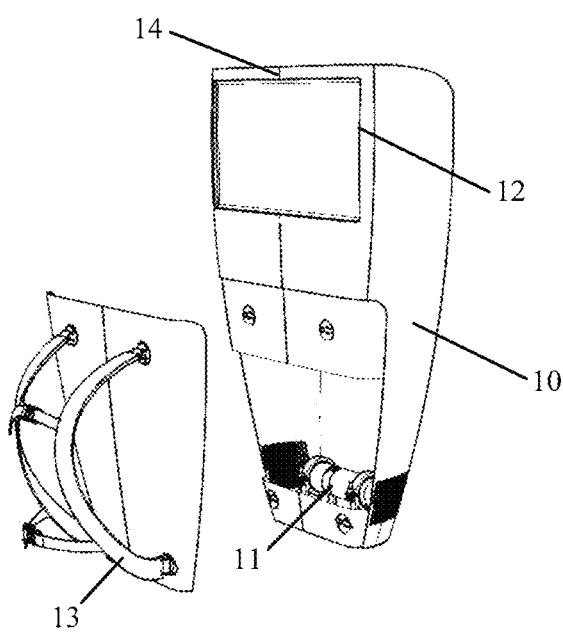
FIG. 2 is a cross-sectional structure diagram of the mobile device for advertisement projecting of the present disclosure shown in FIG. 1.
Figure 3:
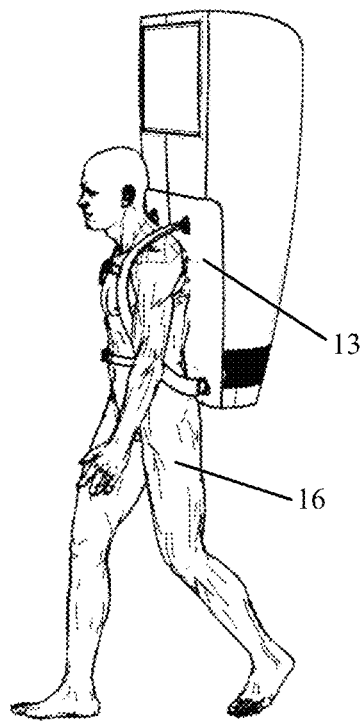
FIG. 3 is a use state diagram of the mobile device for advertisement projecting according to an embodiment of the present disclosure.

FIG. 1 is a structure diagram of a mobile device for advertisement projecting according to the present disclosure, and FIG. 2 is a cross-sectional structure diagram of the mobile device of the present disclosure shown in FIG. 1. Referring to FIG. 1 and FIG. 2, the mobile device for advertisement projecting includes a main unit 10 with control circuit board, a projection module 11, a projection display window 12, a camera module group 14 and a main unit fixing device 13. The projection module 11 is arranged in the main unit 10, preferably at the bottom of the main unit 10, for projecting advertisement contents to the projection display window 12. The main unit fixing device 13 is arranged on the main unit 10 so that a user can conveniently carry the mobile device for advertisement projecting and the projection display window 12 is arranged on the main unit 10 and is used for completely displaying projection contents from the projection module 11. The main unit fixing device 13 may be two shoulder straps which can be detached at any time according to the needs of the user and can be adjusted in length. The main unit fixing device and the projection display window 12 can be arranged on the same plane of the main unit 10 or on opposite planes. The main unit fixing device 13 is not particularly limited as long as it can be fixed to a mobile body. As shown in FIG. 3, the mobile body 16 is, for example, a person, a bicycle, a motorcycle, an electric car, etc. When the mobile body is an object other than a human being, the main unit fixing device 13 may be provided on the bottom surface or the side surface of the main unit 10 so as to be mounted and fixed on the mobile body. The main unit 10 may be powered by a rechargeable battery or alternating current or a wireless charging module.

FIG. 3 is a use state diagram of an example of the mobile device for advertisement projecting according to the present disclosure. With the aid of the main unit fixing device 13, i.e. the two shoulder straps, an advertiser 16 can carry the mobile device for projection display. It should be noted that the main unit 10 is made of a material with small density and large thermal conductivity. The control circuit board is an integrated circuit board with a small volume. The rechargeable battery enables the mobile device for advertisement projecting to work flexibly anytime and anywhere without being restricted by a wired power supply. The mobile device is rich in functionality and entertainment, so power consumption is large, and the wireless charging module can effectively replenish the electric quantity of the rechargeable battery in time. Therefore, the mobile device has light weight and strong endurance, and allows advertisers to display advertisements anytime and anywhere within a long period of time.

Figure 4:
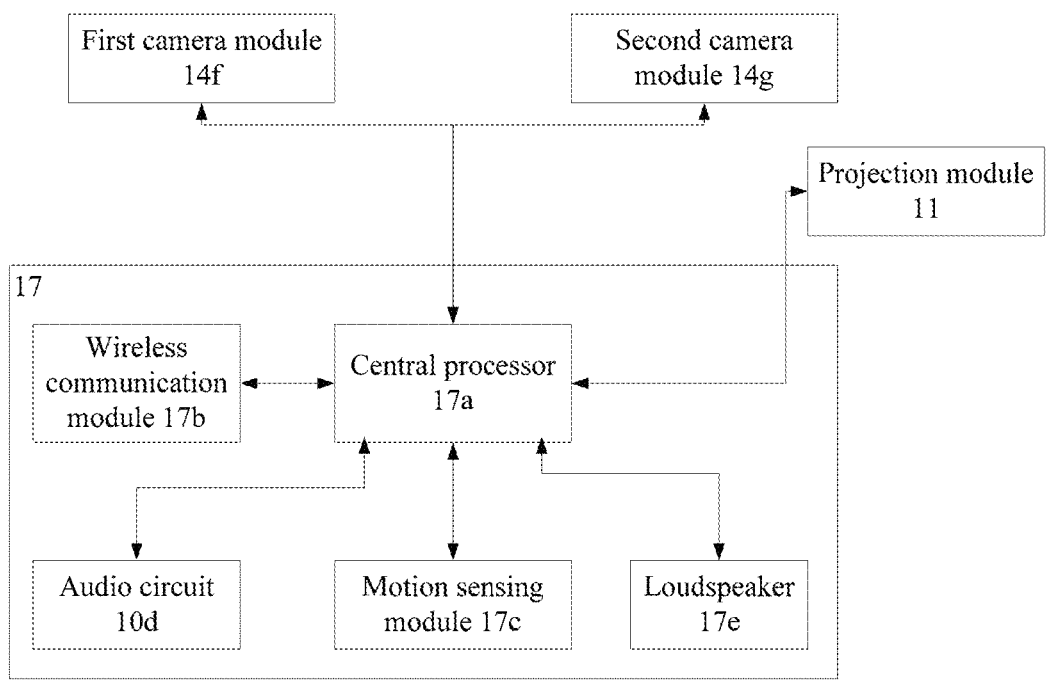
FIG. 4 is a block diagram of the mobile device for advertisement projecting according to an embodiment of the present disclosure.

FIG. 4 is a block diagram of an example of the mobile device for advertisement projecting according to the present disclosure. Referring to FIG. 4, the control circuit board 17 within the main unit 10 comprises a central processor 17a, a wireless communication module 17b, a motion sensing module 17c, an audio circuit 10d, and a loudspeaker 17e. The wireless communication module 17b, the motion sensing module 17c, the audio circuit 10d and the loudspeaker 17e are all connected to the central processor 17a and controlled by the central processor 17a. The motion sensing module 17c can detect the motion information of the mobile device so as to achieve intelligent projection. The wireless communication module 17b further comprises a Bluetooth communicator and/or a Wi-Fi communicator, which can conveniently and quickly receive data information sent by other electronic devices, so as to realize wireless communication of the mobile device for advertisement projecting. In addition, the arrangement of the audio circuit 17d and the loudspeaker 10e provides audio and visual enjoyment for viewers, greatly improving user experience.

The projection display window 12 is provided with a projection display screen 15 which can project and display the advertisement contents more clearly during the day or when the mobile device is moving. In addition, the projection display screen can be folded or rotated or slid so as not to cover the projection display window at all, the direction of folding or rotating or sliding is not limited, and control operation is performed by the control circuit board 17; and display contents from the projection module 11 can be directly displayed on the projection display screen arranged on the projection display window 12 or through the projection display window 12 displayed in an external projection space of the mobile device. For example, when the projection environment is good at night, clear display can be realized in the external projection space or large screen display is needed due to the large number of viewers in front of the projection display window 12, the projection screen can be controlled not to cover the projection display window at all so that advertisement contents can be directly displayed in the external projection space. This makes the use of the mobile device for advertisement projecting more flexible and intelligent.

The camera module group 14 arranged on the main unit 10 includes a first camera module 14f capable of acquiring a projection information of an external projection space of the mobile device; and a second camera module 14g which can acquire projection environment information behind the projection display window 12. The first camera module 14f and the projection display window 12 are arranged on the same plane of the main unit 10, the second camera module 14g is disposed on the opposite side of the first camera module 14f, and the first camera module 14f and the second camera module 14g are both connected to the central processor 10a and controlled by the central processor 10a. For example, when advertisement contents are directly projected and displayed in the external projection space of the mobile device, the first camera module 14f acquires projection information of the external projection space, and the main unit 10 adjusts a projection content frame according to the projection information. In addition, when advertisement contents are directly projected and displayed in the external projection space of the mobile device advertisement projecting and there are viewers behind the mobile device for advertisement projecting, the second camera module 14g acquires projection environment information behind the projection display window, so that projected and displayed advertisement contents can be adjusted according to the projection environment information.

The projection module 11 is a DLP miniature projection module with LED light source which is small in size, light in weight and good in projection effect. The size of the main unit 10 can be adjusted according to the projection ratio of the projection module 11, so that projection contents from the projection module 11 can be completely displayed on the projection display window 12 or through the projection display window 12.

The mobile device for advertisement projecting further includes a GPS configured for acquiring the position of the mobile device for advertisement projecting, and the mobile device for advertisement projecting can be pushed the advertisement contents of nearby merchants according to the position.

Figure 5:
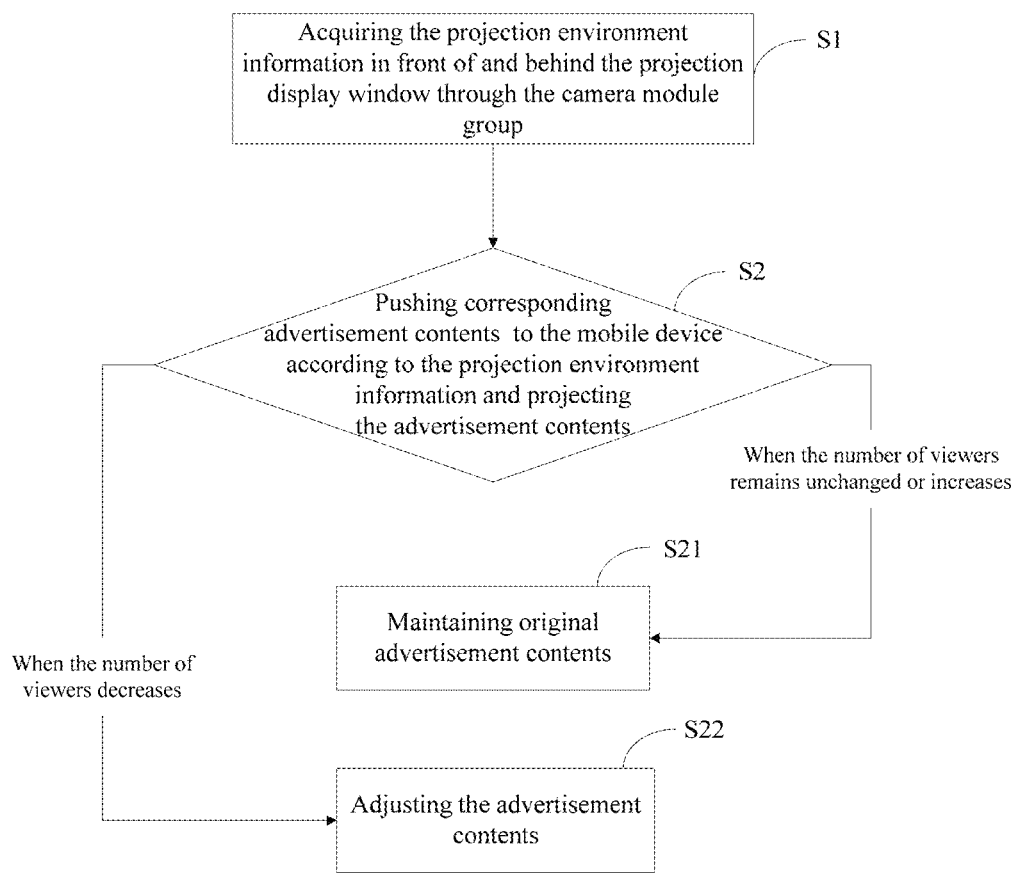
FIG. 5 is a flowchart of a method for mobile advertisement projecting according to an embodiment of the present disclosure.

In order to solve the above technical problems, the present disclosure provides a method for advertisement mobile projecting. FIG. 5 is a flowchart of an embodiment of a method for advertisement mobile projecting according to the present disclosure. First, position and motion information of the mobile device for advertisement projecting are acquired, and projection environment information in front of and behind the projection display window 12 is acquired through the camera module group (step S1). Corresponding advertisement contents are pushed to the mobile device for advertisement projecting according to the projection environment information, and projected by the projection module 11 (step S2). The projection environment information includes the number of viewers in front of and behind the projection display window which is acquired and counted in real time, original advertisement contents are maintained when the number of viewers remains unchanged or increases (step S21), and advertisement contents are adjusted when the number of viewers decreases (step S22).

In addition, the camera module group 14 also determines whether the external projection environment is day or night. Moreover, by comparing real-time environment information in front of and behind the projection display window 12 acquired by the camera module group in a certain period of time to obtain, for example, changes in the number of people, changes in face orientation and changes in expression, the number of viewers is determined. In this way, it is possible to adjust display form and contents of the advertisement more flexibly.

The method for advertisement projecting further includes the step of acquiring the motion information of the mobile device for advertisement projecting through the motion sensing module 17c. When the mobile device for advertisement projecting is in a moving state and there are viewers in front of the projection display window 12, the projection screen covers the projection display window 12 and advertisement contents are directly projected and displayed on the projection display screen to realize clear display; and when the mobile device for advertisement projecting is in a stationary state and the number of viewers in front of the projection display window 12 is larger than a preset value, the projection display screen does not cover the projection display window 12 at all, and advertisement contents are directly projected and displayed in the external projection space of the mobile device, thus realizing large-screen display. Therefore, advertisements can be promoted in a targeted mode, so that viewers can be more impressed by the advertisements and can receive more advertisements, thus improving the advertising effect.

The method for advertisement mobile projecting further comprises the step of acquiring the position of the mobile device, and the advertisement contents of nearby merchants can be pushed according to the position of the mobile device for advertisement projecting. The position can be obtained through the GPS. In addition, the movement route of the mobile device for advertisement projecting is monitored in real time according to the position so as to judge whether the mobile device moves according to a set route and learn the stop time of the mobile device, which is helpful for obtaining the advertisement efficacy value.

The method for advertisement mobile projecting further includes the step of acquiring frame information of the viewers in front of and behind the projection display window by the camera module group to generate projection feedback information, thereby obtaining an advertisement efficacy value, the number of projection times and projection duration, and calculating the reward value of the mobile device for advertisement projecting which is displaying the advertisement contents with the aid of a preset reward calculation model; and the step of acquiring projection environment information in front of the projection display window by the camera module group and adjusting the output brightness of the projection module according to the brightness of the projection environment.

The method for mobile advertisement projecting further includes the step of acquiring projection information of the external projection space by the camera module group so as to adjust a projection content frame when advertisement contents are directly projected and displayed in the external projection space. The projection information may be gray scale information of the projection frame.

The disclosure provides a method and mobile device for advertisement projecting. The mobile device can be conveniently carried by a user, has strong flexibility, and can project advertisement contents anytime and anywhere according to local conditions. This advertising mode enables a target population to actively accept advertisement contents and reduces the probability that viewers are repelled by advertisement contents. In addition, frame information of viewers in front of and behind the projection display window when the mobile device for advertisement projecting projects and plays advertisement contents can be acquired to generate projection feedback information, so as to realize advertisement monitoring and effect tracking.

The above is only an embodiment of the present disclosure and does not limit the patent scope of the present disclosure. Any equivalent structure or equivalent process change made by using the contents of the specification and drawings, or directly or indirectly applied in other related technical fields, is similarly included in the patent scope of the present disclosure.

What is claimed is:

1. A mobile device for advertisement projecting, comprising:
   a main unit provided with a control circuit board;
   a projection module arranged in the main unit for projecting advertisement contents;
   a projection display window arranged on the main unit for completely displaying projection contents from the projection module;
   a projection display screen arranged on the projection display window, the projection display screen capable of folding or rotating or sliding so that the projection display screen does not cover the projection display window at all, the projection contents from the projection module being directly displayed on the projection display screen or through the projection display window displayed in an external projection space;
   a camera module group arranged on the main unit for acquiring projection environment information in front of and behind the projection display window, and
   a main unit fixing device arranged on the main unit for fixing the mobile device for advertisement projecting on a mobile body;
   wherein the main unit is configured to push corresponding advertisement contents which is projected by the projection module according to the projection environment information;
   wherein the projection environment information comprises the number of viewers in front of and behind the projection display window which is acquired in real time;
   wherein the control circuit board comprises a motion sensing module for detecting motion information of the mobile device for advertisement projecting;
   the projection display screen covers the projection display window so that the advertisement contents are directly displayed on the projection screen when the mobile device is in a moving state and there are viewers in front of the projection display window, and
   the projection display screen does not cover the projection display window at all so that the advertisement contents are displayed in an external projection space, when the mobile device for advertisement projecting is in a stationary state and the number of viewers in front of the projection display window is larger than a preset value.

2. The mobile device according to claim 1, wherein the advertisement contents are maintained when the number of viewers remains unchanged or increases and adjusted when the number of viewers decreases.

3. The mobile device according to claim 1, wherein the control circuit board comprises a wireless communication module for transmitting and receiving data information with other electronic devices through Bluetooth communication and/or Wi-Fi communication.

4. The mobile device according to claim 1, wherein the main unit is powered by a rechargeable battery or alternating current or a wireless charging module.

5. The mobile device according to claim 1, wherein the projection module is a DLP miniature projection module with LED light source.

6. The mobile device according to claim 1, wherein the size of the main unit is adjusted according to the projection ratio of the projection module.

7. The mobile device according to claim 1, wherein the camera module group comprises:
   a first camera module arranged on a plane having the projection display window of the main unit, configured for acquiring projection information of an external projection space,
   a second camera module arranged on opposite side of the first camera module, configured for acquiring projection environment information behind the projection display window.

8. The mobile device according to claim 1, further comprising:
   a GPS configured for acquiring a position of the mobile device for advertisement projecting,
   the main unit configured to push the advertisement contents of nearby merchants according to the position of the mobile device for advertisement projecting.

9. The mobile device according to claim 7, wherein the main unit adjusts a projection content frame according to the projection information of the external projection space acquired by the first camera module when advertisement contents are directly projected and displayed in the external projection space.

10. A method for mobile advertisement projecting, comprising:
    acquiring a projection environment information in front of and behind a projection advertisement window, the projection environment information comprising the number of viewers in front of and behind the projection display window which is acquired and counted in real time;
    pushing corresponding advertisement contents according to the projection environment information;
    projecting the corresponding advertisement contents by a projection module, and
    acquiring motion information of a mobile device for advertisement projecting;
    covering the projection display window with a projection display screen and projecting the advertisement contents on the project display screen for clear display when the mobile device for advertisement projecting is in a moving state and there are viewers in front of the projection display window,
    projecting the advertisement contents in an external projection space of the mobile device for advertisement projecting though the projection display window which is not covered by the projection display screen at all, when the mobile device for advertisement projecting is in a stationary state and the number of viewers in front of the projection display window is larger than a preset value.

11. The method according to claim 10, wherein the providing corresponding advertisement contents according to the projection environment information comprises:
    maintaining the advertisement contents when the number of viewers remains unchanged or increases, and
    adjusting the advertisement contents when the number of viewers decreases.

12. The method according to claim 10, when the advertisement contents is being projected in an external projection space of the mobile device for advertisement projecting, further comprising:
    acquiring projection information of the external projection space;
    adjusting projecting contents frame according to the projection information.

13. The method according to claim 10, further comprising:
    acquiring frame information of viewers in front of and behind the projection display window;
    generating projection feedback information according to the frame information;
    obtaining an advertisement efficacy value, the number of projection times and projection duration;
    calculating a reward value of the mobile device for advertisement projecting with the aid of a preset reward calculation model.

14. The method according to claim 10, further comprising:
    adjusting output brightness of the projection module according to brightness of the projecting environment information in front of the projection display window.

15. The method according to claim 10, further comprising:
    acquiring position of the mobile device for advertisement projecting;
    pushing corresponding advertisement contents of the nearby merchants according to the position of the mobile device for advertisement projecting.

16. A mobile device for advertisement projecting, comprising:
    a main unit provided with a control circuit board;
    a projection module arranged in the main unit for projecting advertisement contents;
    a projection display window arranged on the main unit for completely displaying projection contents from the projection module;
    a projection display screen arranged on the projection display window, the projection display screen capable of folding or rotating or sliding so that the projection display screen does not cover the projection display window at all, the projection contents from the projection module being directly displayed on the projection display screen or through the projection display window displayed in an external projection space;
    a camera module group arranged on the main unit for acquiring projection environment information in front of and behind the projection display window, and
    a main unit fixing device arranged on the main unit for fixing the mobile device for advertisement projecting on a mobile body;
    wherein the main unit is configured to push corresponding advertisement contents which is projected by the projection module according to the projection environment information.

* * * * *